(12) United States Patent
Guillen

(10) Patent No.: US 8,756,637 B1
(45) Date of Patent: Jun. 17, 2014

(54) AUTOMATIC ANTENNA REDIRECTION SYSTEM AND METHOD

(71) Applicant: BBY Solutions, Inc., Richfield, MN (US)

(72) Inventor: Newton Guillen, Plymouth, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 13/685,783

(22) Filed: Nov. 27, 2012

(51) Int. Cl.
*H04N 7/20* (2006.01)
*H01Q 3/00* (2006.01)
*H04N 21/485* (2011.01)
*H04N 5/44* (2011.01)
*H01Q 1/12* (2006.01)
*H01Q 3/02* (2006.01)

(52) U.S. Cl.
CPC ......... *H04N 21/485* (2013.01); *H04N 5/4403* (2013.01); *H01Q 1/125* (2013.01); *H01Q 3/02* (2013.01)
USPC ........................................... 725/72; 343/757

(58) Field of Classification Search
CPC ... H04N 21/485; H04N 5/4403; H01Q 1/125; H01Q 3/02
USPC .............. 725/72; 343/703, 757, 879; 342/359
See application file for complete search history.

(56) References Cited

U.S. PATENT DOCUMENTS

| | | | |
|---|---|---|---|
| 4,169,226 A * | 9/1979 | Fukuji | 455/151.4 |
| 6,832,070 B1 * | 12/2004 | Perry et al. | 455/3.02 |
| 7,239,274 B2 * | 7/2007 | Lee et al. | 342/359 |
| 7,472,409 B1 * | 12/2008 | Linton | 725/76 |
| 7,576,702 B2 | 8/2009 | Yin et al. | |
| 2003/0051246 A1 * | 3/2003 | Wilder et al. | 725/49 |
| 2004/0128689 A1 * | 7/2004 | Pugel et al. | 725/72 |
| 2005/0108751 A1 * | 5/2005 | Dacosta | 725/39 |
| 2005/0193415 A1 * | 9/2005 | Ikeda | 725/49 |
| 2006/0020978 A1 * | 1/2006 | Miyagawa | 725/72 |
| 2006/0139499 A1 * | 6/2006 | Onomatsu et al. | 348/725 |
| 2008/0186409 A1 * | 8/2008 | Kang et al. | 348/731 |
| 2009/0135309 A1 * | 5/2009 | DeGeorge et al. | 348/732 |
| 2009/0310030 A1 * | 12/2009 | Litwin et al. | 348/731 |
| 2010/0177000 A1 | 7/2010 | Brisebois et al. | |
| 2010/0214482 A1 * | 8/2010 | Kang | 348/563 |
| 2011/0273359 A1 | 11/2011 | Tischer | |

* cited by examiner

*Primary Examiner* — Nasser Goodarzi
*Assistant Examiner* — Michael B Pierorazio
(74) *Attorney, Agent, or Firm* — Beck & Tysver PLLC

(57) ABSTRACT

A geolocation smart antenna system is presented. In the system a database of television station information is provided. The database may include information such as channel number, broadcast frequency, network affiliation, and locations of one or more terrestrial television broadcast towers. An optimal antenna direction is determined based on a determined geographic location of an antenna and a geographic location of a broadcast tower. A system user selects a television program or television network broadcasted by a television station. A selection signal is sent to an antenna controller, and in response a television antenna is automatically oriented in an optimal direction toward a broadcast tower for the selected station. The selection signal may also be sent to a television receiver, and in response a television tuner is tuned to the station's radio frequency channel.

24 Claims, 4 Drawing Sheets

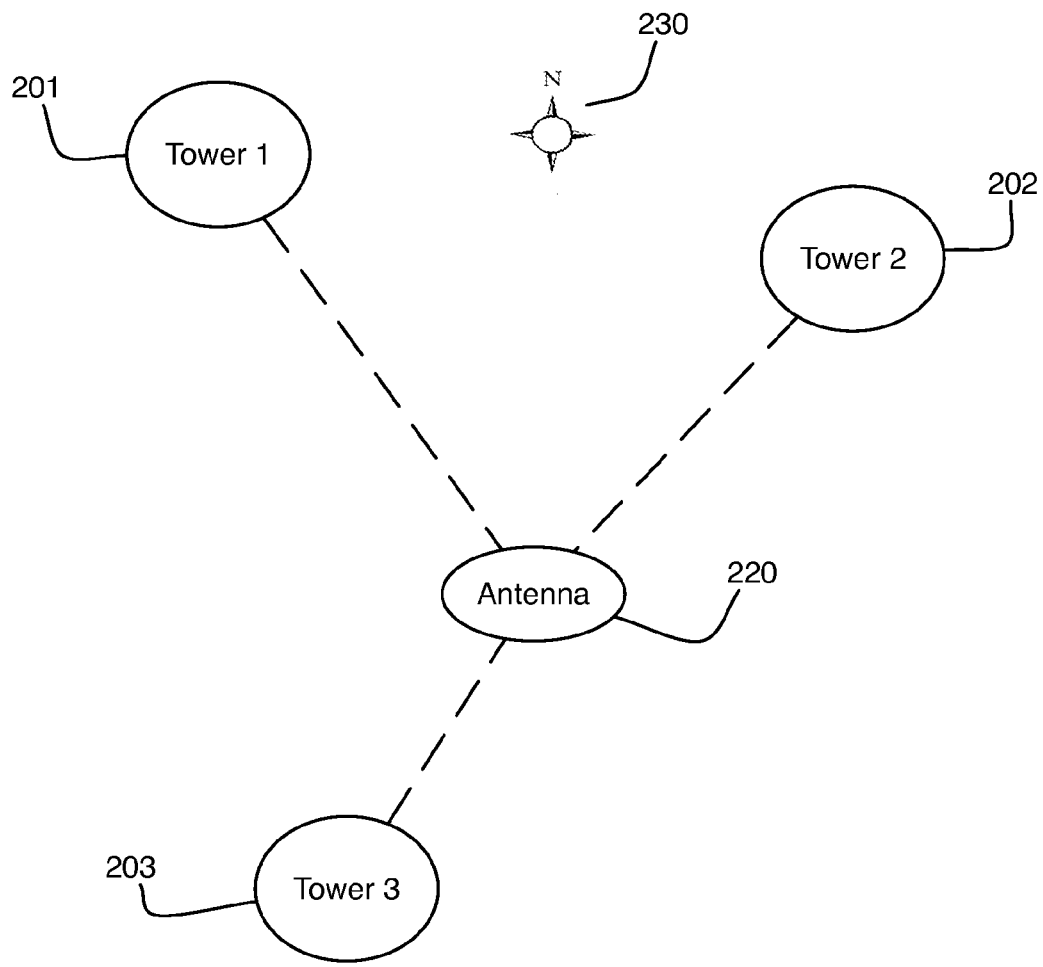

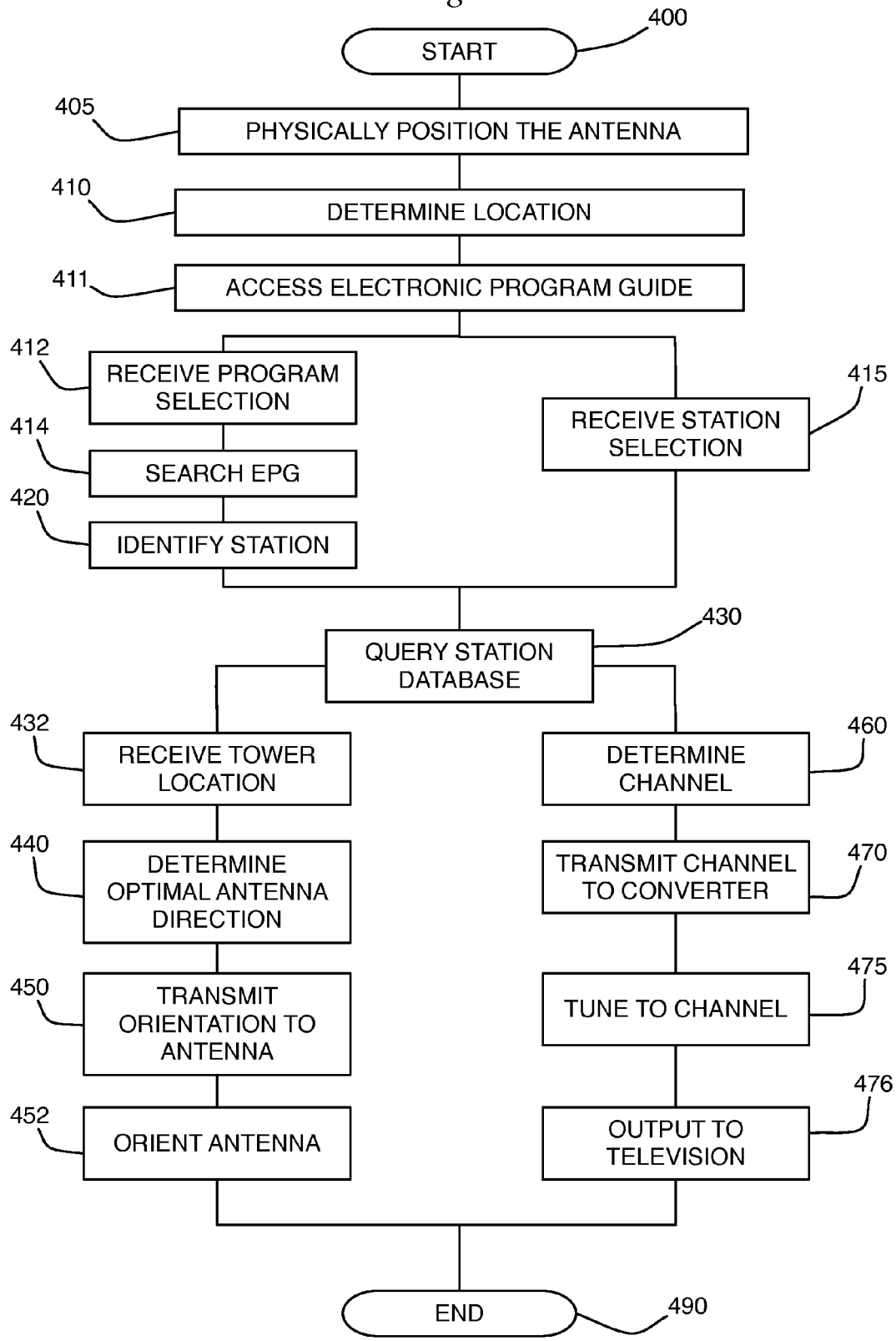

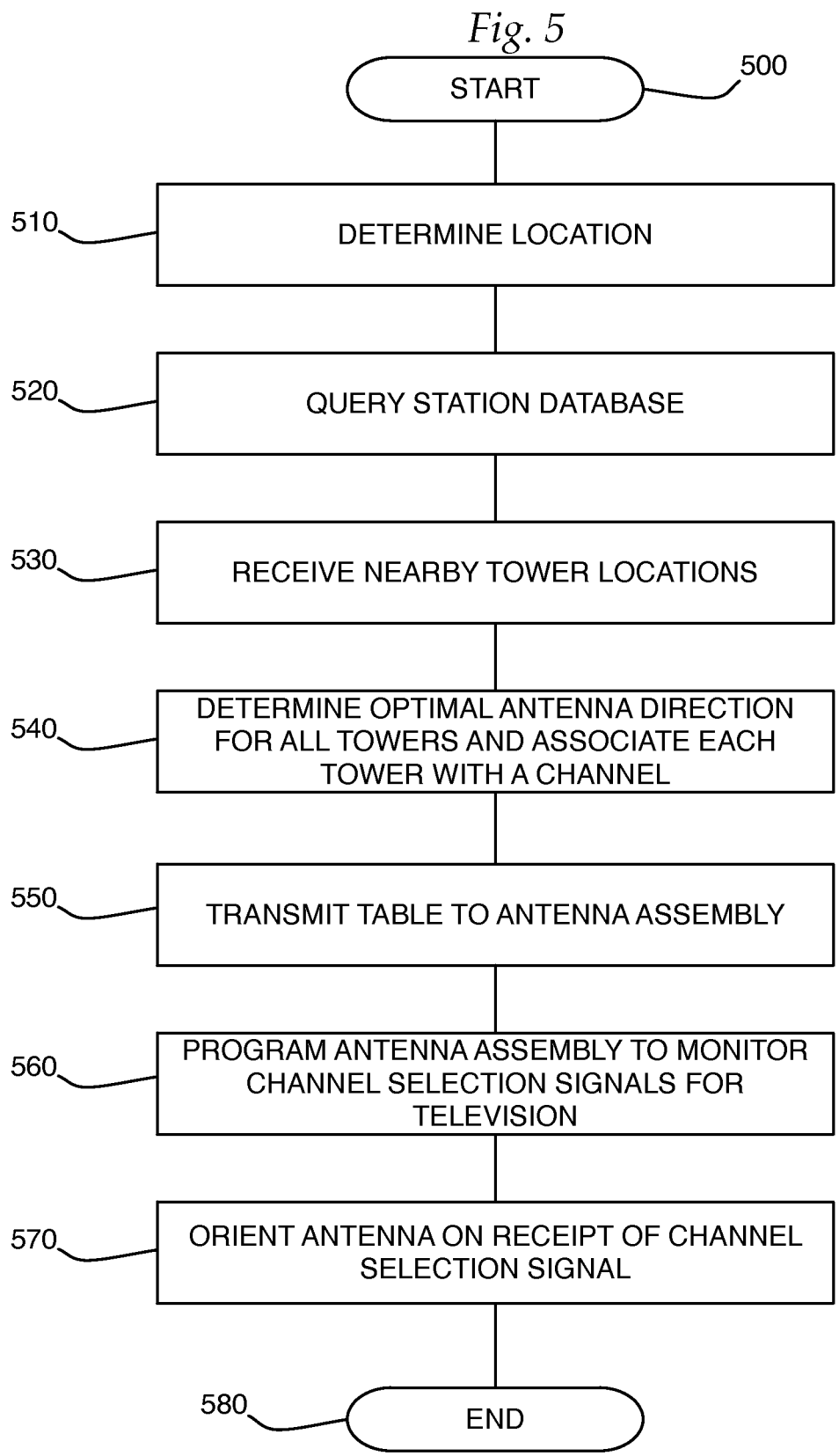

AUTOMATIC ANTENNA REDIRECTION SYSTEM AND METHOD

FIELD OF THE INVENTION

The present application relates to the field of smart television antenna controllers. More particularly, the described embodiments relate to a system for orienting an antenna in an optimal direction toward a broadcast station tower in response to a viewing selection signal.

SUMMARY

One embodiment of the present invention provides a system for instructing an antenna to orient toward a terrestrial television station broadcast tower. The system may include a mobile device accessing a database of station information; an antenna; an antenna controller; and a television converter box receiving broadcast signals from the antenna and demodulating the signals to send video and audio output to a television.

BRIEF DESCRIPTION OF THE DRAWINGS

FIG. 2 is a schematic diagram showing a plurality of terrestrial station broadcast towers in transmission proximity of an antenna.

FIG. 3 shows an example of information contained in a station database.

FIG. 4 is a flow chart showing a method of redirecting an antenna.

FIG. 5 is a flow chart showing a method of determining an optimal antenna direction for one or more television broadcast towers.

DETAILED DESCRIPTION

Figure 1:
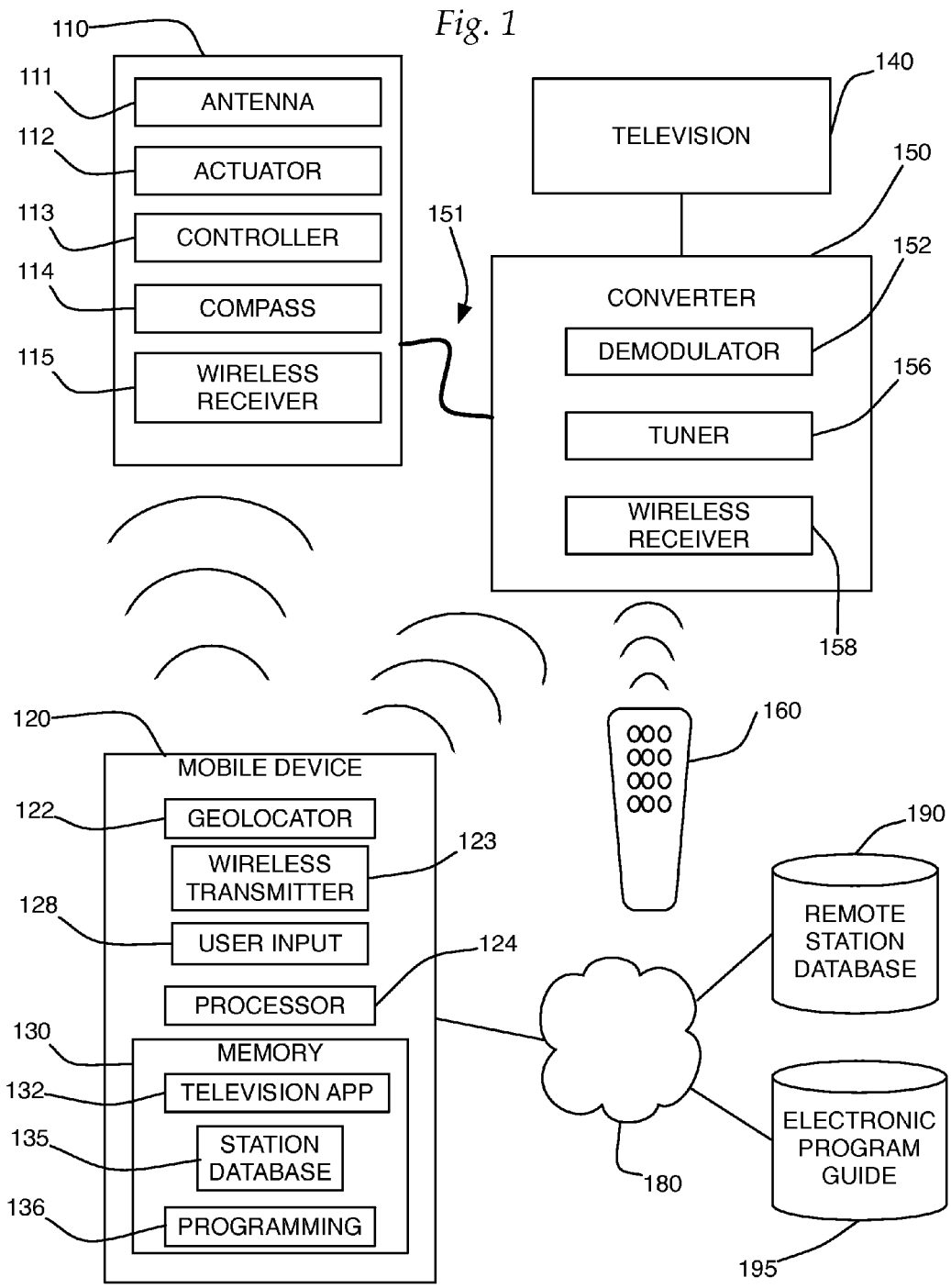
FIG. 1 is a schematic diagram of the automatic antenna redirection system.

FIG. 1 shows a schematic diagram of an embodiment of the present system. The system includes a mobile device 120, an antenna assembly 110, and a converter box 150 connected to a television 140. Antenna assembly 110 includes an antenna 111, which is preferably a digital television (HDTV) antenna. Such antennas may be direction-specific, and must be physically moved to a particular orientation to receive an optimal signal from a digital television transmission tower. Factors that affect the quality of signal reception include the signal strength of the original broadcast, distance to the broadcast towers, geographic topography such as trees and hills, and the presence of buildings or houses near the antenna. Orienting the antenna manually to be directed toward the broadcast tower is imprecise, and often inconvenient if the antenna is located outdoors, such as on a roof. To facilitate orientation of antenna 111, a controller 113 gives instructions to an actuator 112 to rotate antenna 111 to a selected directional orientation. The actuator 112 could be implemented as a stepper motor that controls the directional orientation of the antenna 111. A compass 114 pointing north may provide a reference direction for the antenna assembly 110. Actuator 112 may rotate antenna 111 relative to magnetic north around a vertical axis. A wireless receiver 115 in antenna assembly 110 is capable of receiving controller instructions from an external source, such as from a remote control or mobile device 120. Wireless receiver 115 may be configured to receive infrared or radio frequency wireless signals, but may also be capable of receiving signals via wireless protocols such as Bluetooth protocol, Wi-Fi, or cellular GSM or CDMA wireless.

Converter 150 of FIG. 1 receives broadcast transmission signals from antenna assembly 110, typically through a wired connection 151. Antenna 111 receives a wide range of television frequencies in both the VHF (30-300 MHz) and UHF (300-3,000 MHz) spectra. A tuner 156 in converter 150 selects a desired radio frequency corresponding to a broadcast channel, and filters out signals from all frequencies other than the desired frequency. The received signals are then sent to a demodulator 152 and converted into video and audio output signals that can be sent to the connected television 140. This conversion process may require demodulation, decompression, error correction, synchronization, and image reformatting, as is well known in the prior art. Converter 150 also has a wireless receiver 158 for receiving control instructions from an external source such as a mobile device. As with the antenna assembly 110, the wireless receiver 158 may be configured to receive infrared or radio frequency signals, or may receive signals via wireless protocols such as Bluetooth or Wi-Fi. The wireless receiver may additionally respond to infrared signals from a conventional remote controller 160. The converter 150 may be implemented as an HDTV tuner within a television 140, or as a HDTV receiver that is physically separate from the television 140.

Mobile device 120 of FIG. 1 comprises a computer processor 124, a memory 130, a wireless interface 123, and an electronic geographic position location device 122. Geolocator 122 may be a global positioning system (GPS) device, but could also use alternative means of determining a geographic location, such as triangulation using cellular communication towers, IP address-based geolocation, or Wi-Fi access point geolocation. In another embodiment, a location such as a street address could be automatically or manually entered into the mobile device to generate a geographic location for the device. Processor 124 controls the various functions of the mobile device. Memory 130 contains programming logic 136 and an internal database of station information 135. Mobile device 120 preferably has a mobile application program 132 ("television app") stored in the memory 130. A user can select a particular television station, channel, network, or program through the television app 132 via user input 128.

Station database 135 contains information about television stations in one or more geographic regions. The database 135 may contain information including but not limited to a station call sign, a radio frequency channel associated with the station, a television broadcast network affiliated with the station, and a location for a broadcast tower for the station. Other similar types of information related to television station and television tower location will be stored in the database 135.

Alternatively, the station information database may reside remotely from mobile device 120. A remote station database 190 accessible over a remote network 180 such as the Internet may provide the same information as the internal station database 135, or may contain a larger or more up-to-date version of the station information for television stations in various geographic regions. An electronic program guide (EPG) 195 may also be accessed by device 120 over network 180. EPG 195 may contain viewing information for the stations in station database 135. The information in the EPG 195 includes information about available television programs on television networks and stations for a particular geographic region. Television programs may be searchable in the EPG.

In an alternative embodiment, the antenna assembly 110 could be modified to contain more or fewer components. For example, controller 113 could reside on the converter 150. In this case, wireless receiver 115 could be omitted. Antenna orientation instructions would then be sent from converter 150 to the antenna assembly 110 over connection 151.

In another alternative embodiment of the system, the station database may reside on the converter 150. The database may be updated periodically, for example via a remote data connection. In this embodiment, mobile device 120 would again provide geographic coordinates of the device 120 using geolocator 122, but would transmit the coordinates to receiver 150. The coordinates could then be used to query the database on the receiver 150. The query would return a location for a station tower, and a processor on the receiver could determine an orientation for the antenna 110 based on the coordinates and the tower location. The receiver 150 would then send instructions to cause the actuator 112 to rotate the antenna 111 to the desired orientation.

Turning to FIG. 2, a directional antenna 220 is situated at a particular geographic location. One or more television broadcast towers 201, 202, 203 may be fixed at different geographic locations in broadcast proximity to antenna 220. Because antenna 220 is a directional antenna, antenna 220 does not receive optimal broadcast signals from towers 202, 203 when the antenna 220 is oriented toward tower 201. The system of FIG. 1 can be used to optimally orient antenna 220 toward a selected one of towers 201, 202, 203 to receive a television broadcast.

FIG. 3 shows a table of part of the information that could be contained in station database 135, 190. Table 340 shows a list of station information for a television station. Station database 135, 190 may provide station identification information 321, which may be represented as a call sign for a television station. A network affiliate 322 may represent a broadcast network that broadcasts television programs. RF channel 323 may represent the channel number or sub-channel number that a tuner 152 may select for a particular station 321, such as sub-channel 11-2 (the channel or sub-channel corresponds to a standardized UHF or VHF radio frequency band over which television signals are broadcast). A tower location 324 for the station 321 may be provided as latitude and longitude coordinates, or other appropriate geographic location coordinates.

FIG. 4 shows a method 400 for automatically redirecting an antenna. The method provides a way to automatically orient a directional antenna to an optimal orientation toward a terrestrial broadcast station tower, and at substantially the same time automatically instruct a television receiver to tune to an RF channel for that station. Although shown as a sequence of steps in FIG. 4, the method may be performed in any combination and in any order; it would be possible to exclude some steps or add additional steps. The method may be performed in response to a single user command using the system of FIG. 1. In a preferred embodiment, a single request is made through a user input 128 of a mobile device 120 controlling a television app 132.

The method 400 begins at step 405 in which the antenna assembly 110 is physically positioned relative to a reference direction. In one embodiment, the antenna assembly 110 includes a magnetic compass 114 that is visible to the user. A "north" orientation indicator is placed on the external case of the antenna assembly 110. Because the mobile device 120 sends orientation instructions to the antenna assembly 110 based on deviation from a known orientation, it is important that the antenna assembly 110 be appropriately positioned in relation to a reference direction such as magnetic north. In this embodiment the user is instructed to orient the antenna assembly 110 so that the "north" orientation indicator is oriented in the same direction as the magnetic north indicated by the compass 114.

In an alternative embodiment an electronically-readable compass 114 is embedded into the antenna assembly 110. In this embodiment, step 405 is not necessary because the controller 113 in the antenna assembly 110 will automatically identify magnetic north from the electronically-readable compass 114.

At step 410, a geographic location for an antenna is determined. In the preferred embodiment a location of a mobile device is determined using electronic position location device 122. The mobile device location is essentially the same as the antenna location, since the mobile device is presumed to be in the same building (e.g., a house or apartment) as the antenna. In optional step 411 an electronic program guide 195 may be accessed remotely via a remote network 180. The EPG 195 contains a database of television programs and stations available in a geographic region. A user can browse or search through information in the EPG 195 and select an available television program or television station.

In one embodiment, the user of the electronic device 120 can request to watch a particular television channel or television program. For example, a user may wish to watch a television program such as "Law and Order." This request may be received in step 412 as a program selection. In step 414 the EPG 195 is searched using the program selection of step 412 as a search query. The EPG 195 would then retrieve information regarding which television station or stations offer the selected television program in that geographic location at the current time. A television station that offers the selected television program would then be identified in step 420 using the data from the EPG 195. The television station offering the program could be identified in step 420 by a station name, a channel, a network affiliate, etc. Alternatively, the user could browse the EPG 195 and examine all the currently playing shows. This list would be displayed through the television app 132 on the mobile device 120, and the user would directly select the television station and program at the same time. Alternatively, instead of utilizing an electronic programming guide, in step 415 a station selection may be received through direct user input as a television station, a television channel, a network affiliate, etc. In most cases, this input would be received by the user directly inputting the desired channel into the user input portion 128 of the mobile device 123. For example, a 10 key number pad could be displayed on the mobile device 120 which would allow direct numeric input for a desired channel.

In step 430 the station database 135, 190 is queried using the information received from the selecting steps 415 or 420. The station database query may contain one or more of the determined geographic location, a station identifier, a network affiliate, an RF channel, or other identifier for a television station in a geographic region. Since database 135, 190 contains a number of different identifying characteristics for a particular television station, the query in step 430 could include any one of a number of different query search terms that would return the same desired query result—namely the geographic location 324 for the broadcasting tower. For a particular antenna location 220, the same tower location 324 could be returned from a station database query of any of station 321, network affiliate 322, or RF channel 323.

In step 432 the query result is received as a tower location result. In step 440, a calculation is performed at the mobile device using the device geographic location and the received tower geographic location to determine an optimal antenna direction. In one embodiment, the result of this calculation is an angular orientation with respect to a reference direction such as magnetic north. In step 450 the optimal orientation is transmitted to the antenna assembly 110. The orientation is used by the mobile device 120 to transmit orientation instructions to the controller 113 on antenna assembly 110. In step 452 an actuator 112 physically orients the antenna 111 in accordance with the received orientation instructions. Assuming proper orientation of the antenna during set-up, this orientation should point the antenna in an optimal direction toward the terrestrial television broadcast tower for the station selected in step 415 or 420.

In the embodiment described above, the station identifier is used to query database 135 or 190, and a geographic location for that station identifier is then returned. Alternatively, in the case of a remote station database 190, the query to the database 190 could include both the desired broadcast channel and the current location of the mobile device 120. In this embodiment, a calculation is performed remotely using the information in database 190, and the database returns the broadcast tower location as an angular direction in relation to a reference direction such as magnetic north. If the tower location was received from the database in step 432 as an angular orientation, the optimal antenna direction is the received angular orientation and step 440 could be skipped.

At the same time that the mobile device 120 sends the orientation information to the antenna assembly 110 in step 450, the mobile device 120 also sends a change-channel signal to the converter 150 that controls video programming on the television 140. As explained above, the input 412, 415 received from the user may take the form of a program selection 412 identified using the EPG 195, or through a direct selection of a channel 415. The desired television channel is determined at step 460 either directly from that input, or through use of the electronic program guide. Mobile device 120 transmits instructions in step 470 to converter 150 via wireless receiver 158 to turn a tuner 156 to the desired RF channel. In step 475 the tuner 156 tunes to the received channel, which allows the converter 150 to send received broadcast signals through demodulator 152, then send the demodulated signals to television 140 to be output as video and audio in step 476. After the antenna 111 has been oriented to the optimal direction and the converter 150 has tuned to the selected channel, the method ends at step 490.

In another embodiment, optimal antenna directions for available channels for a particular antenna location are stored in a reference table on the mobile device. A query to the station database 135, 190 is made at one time to receive all of the broadcast antenna locations available at a particular geographic location. The appropriate orientation directions for all nearby broadcast antennas are determined for the current location of the mobile device 120, and this information is then stored in the memory 130 of the mobile device. As a result, the station database need not be queried each time a new television station is selected. All that is necessary is that the mobile device 120 receives a desired channel from the user, either directly or through the interface presenting the EPG 195 on the mobile device 120. The table then identifies the orientation for the antenna, and the appropriate orientation is sent to the antenna assembly 110 along with the channel selection signal that is sent to the converter 150.

In the above-described embodiments, a single selection of a desired channel on the mobile device 120 causes an antenna orientation signal to be sent to the antenna 110 and a channel selection signal to be sent to the television converter 150 and tuner 156. Other embodiments could be created to cause only a single signal to be sent by the mobile device 120. For instance, it would be possible for the wireless receiver 115 of the antenna assembly 110 to be programmed to identify and respond to channel selection signals sent to the converter 150. It is well known that universal remotes can be easily programmed to submit channel selection infrared commands to televisions 140 and converters 150 regardless of the manufacturer of those components 140, 150. A similar technology could be used to program the wireless receiver 115 to receive and identify channel selection signals that are intended for the converter 150. As the antenna assembly 110 is now receiving channel selection signals instead of orientation instructions, the table discussed in the previous paragraph would need to be created by the mobile device 120 and then transmitted for storage on the antenna assembly.

The method 500 for implementing this embodiment is shown in FIG. 5. The method starts by determining the location of the mobile device at step 510. At step 520, the station database 135, 190 is queried to identify the locations of nearby towers, which are then received from the database in step 530. At step 540, the mobile device 120 determines the appropriate antenna directions for all of the relevant local towers received at step 530. At the same time, the mobile device 120 associates each of the local towers with one or more channels that may be selected on the television tuner 156. Using this information, the mobile device 120 is able to create a simple table establishing a relationship between each of the local channels accessible by the tuner with an antenna direction for the terrestrial tower transmitting that channel. This table is then transmitted from the mobile device 120 to the antenna assembly 110 at step 550. This transmission can occur via the wireless transmitter 123 of the mobile device 120 and the wireless receiver 115 of the antenna assembly 110. Next, it is necessary to inform the antenna assembly of the format of the channel selection signals that are received by the wireless receiver 158 of the converter 150 at step 560. This is typically driven by the make and model of the converter 150 or the television 140 in which the converter 150 is included. In one embodiment, the antenna assembly 110 is pre-programmed to understand a variety of channel selection signals, and all that is required by step 560 is for the user interface on the mobile device 120 to direct the user to select the appropriate make and model of the converter 150 or television 140, and for the mobile device 120 to transmit this information to the antenna assembly 110. At step 570, any channel selection signal sent to the converter 150, such as from either the mobile device 120 or the remote 160, will be received simultaneous by the converter 150 and the antenna assembly 110. The antenna assembly 110 will use this input to determine the appropriate antenna direction for that channel selection input based on the table received at step 550. Once the appropriate antenna direction is determined, the antenna 111 is moved accordingly. This allows the antenna assembly 110 to direct the antenna without a dedicated signal being sent just to the wireless receiver 115 of the assembly 110.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for automatically redirecting an antenna, the method comprising:
   a) on a first device that does not contain an electronic antenna actuator and does not contain a television tuner, determining a geographic location of the first device;
   b) receiving a viewing selection on the first device;
   c) querying a station database from the first device using the geographic location;
   d) receiving a station database query result at the first device comprising tower location information for a first television station offering the viewing selection, e) determining a directional orientation for the antenna based on the station database query result;

f) after steps b) and e), transmitting from the first device a first set of instructions to the electronic antenna actuator thereby causing the electronic antenna actuator to orient the antenna in the determined directional orientation based on the first set of instructions; and g) transmitting from the first device a second set of instructions to the television tuner thereby causing the television tuner to tune to the first television station;

wherein the first and second set of instructions are sent wirelessly using a signaling technology chosen from a set comprising radio frequency signaling, IEEE 801.11 signaling, and infrared signaling.

2. The method of claim 1, wherein the first device is a mobile device, further wherein the viewing selection is received from a user input on the mobile device, and steps f) and g) are performed automatically in response to receiving the viewing selection without receiving additional input from the user input on the mobile device.

3. The method of claim 1, wherein the viewing selection is a selection of a television program, the method further comprising:

h) using the selected television program to query an electronic program guide;

i) receiving a program guide query result; and j) using the program guide query result to query the station database;

wherein the program guide query result is the first television station offering the viewing selection.

4. The method of claim 1, wherein the viewing selection is one of a television channel and a television network.

5. The method of claim 1, wherein the first device is a mobile device, further wherein the station database is stored on an internal memory of the mobile device and the station database query is performed by a processor within the mobile device.

6. The method of claim 1, wherein the station database is stored on a remote server accessible via a remote information network.

7. The method of claim 1, wherein the tower location information comprises tower latitude and longitude coordinates, and the directional orientation is determined based on the tower latitude and longitude coordinates and the antenna geographic location.

8. The method of claim 1, further comprising:

h) determining a reference orientation for the antenna;

wherein the determined directional orientation is an orientation relative to the reference orientation.

9. An electronic mobile device for controlling an antenna system that is external to the mobile device and for controlling a television tuner that is external to the mobile device, the mobile device comprising:

a) a computer processor;
b) a non-transient physical electronic memory;
c) a geographic position locator;
d) a wireless data transmitter;
e) control logic residing in the electronic memory and configured to:
  i) determine a location for the mobile device using the geographic position locator found on the mobile device,
  ii) query a database of television station information using the determined location and an identifier for a television station,
  iii) receive a query result including a location of a terrestrial broadcast tower for the television station,
  iv) wirelessly transmit first instructions for the antenna system thereby causing an antenna in the antenna system to be physically oriented toward the broadcast tower location, and
  v) wirelessly transmit second instructions for the television tuner to tune to a channel for the television station.

10. The mobile device of claim 9, wherein the device further comprises a device input interface, and the control logic is further configured to receive the television station identifier through the input interface.

11. The mobile device of claim 10, wherein the television station identifier identifies one of a television broadcast network, a television channel, and a television station.

12. The mobile device of claim 10, wherein the first instructions to orient the antenna and second instructions to tune to a channel are transmitted based on a single television station identifier being received through the input interface.

13. The mobile device of claim 10, wherein the input interface includes a mobile device software application.

14. The mobile device of claim 9, wherein the database resides in the device electronic memory.

15. The mobile device of claim 9, wherein the database resides in a remote data store accessible via a remote data network.

16. A television antenna system comprising:

a) an electronic mobile device having
  i) an electronic computer processor,
  ii) a physical electronic memory,
  iii) computer programming residing on the memory and having access to a station database, the station database including broadcast channels and terrestrial station tower locations for one or more television stations,
  iv) an electronic position locator identifying a geographic location of the electronic mobile device,
  v) a channel-selection wireless transmitter for transmitting a channel selection signal to a television tuner that is separate from the electronic mobile device thereby causing the television tuner to tune to a channel appropriate for the channel selection signal, and
  vi) an antenna-orientation wireless transmitter for transmitting antenna orientation instructions, the antenna orientation instructions generated based on the identified device geographic location as determined by the electronic position locator on the mobile device and a station tower location for the channel; and b) an antenna assembly having
  i) a first wireless receiver to receive the antenna orientation instructions,
  ii) a rotational actuator connected to an antenna, and
  iii) control circuitry acting on the rotational actuator to cause the rotational actuator to automatically orient the antenna in a direction specified by the antenna orientation instructions.

17. The system of claim 16, wherein the antenna assembly further comprises:

iv) a directional compass indicating a magnetic north direction;

wherein the antenna orientation instructions include an orientation relative to magnetic north.

18. The system of claim 16, wherein the geographic location of the electronic mobile device is identified by one of a global positioning system (GPS) coordinate, a ZIP code, a city, and a street address.

19. The system of claim 16, wherein the channel-selection wireless transmitter and the antenna-orientation wireless transmitter are a single wireless transmitter.

20. The system of claim 19, wherein the single wireless transmitter is an infrared transmitter.

21. The system of claim 16, wherein the database is a remote database accessible via a remote data network.

22. The system of claim 16, wherein the database is stored in the physical electronic memory.

23. A method for automatically redirecting an antenna, the method comprising:
   a) first, determining a geographic location of the antenna;
   b) second, querying a station database using the antenna geographic location;
   c) third, receiving a station database query result comprising tower location information for a plurality of terrestrial broadcasting towers proximal to the antenna geographic location;
   d) fourth, creating a table associating a plurality of channels broadcast by the broadcasting towers with antenna direction orientation settings, the antenna direction orientation settings being determined by the station database query result;
   e) fifth, receiving a channel selection based upon a user input on a first device;
   f) sixth, determining a directional orientation for the channel selection using the table; and
   g) seventh, transmitting from the first device, using a wireless technology selected from a set comprising radio frequency signaling, IEEE 801.11 signaling, and infrared signaling, signals containing both of the following without receiving additional user input:
      i) a first set of instructions to an antenna controller to orient the antenna in the determined directional orientation; and
      ii) a second set of instructions to a television tuner to tune to the selected channel.

24. A method for automatically redirecting an antenna, the method comprising:
   a) determining a geographic location of the antenna;
   b) querying a station database using the antenna geographic location;
   c) receiving a station database query result from the station database comprising tower location information for a plurality of terrestrial broadcasting towers proximal to the antenna geographic location;
   d) creating a table associating a plurality of channels broadcast by the terrestrial broadcasting towers with antenna direction orientation settings, the antenna direction orientation settings being determined by the station database query result;
   e) transmitting the table to an antenna controller;
   f) programming the antenna controller to respond to remote control signals intended for and formatted to be understood by a separate television tuner
   g) receiving a first channel selection signal formatted for the television tuner at the antenna controller;
   h) determining a directional orientation for the first channel selection signal at the antenna controller using the table;
   i) the antenna controller orienting the antenna to the directional orientation for the first channel selection signal;
   j) receiving the first channel selection signal at the television tuner; and
   k) tuning the television tuner based on the first channel selection signal.

* * * * *

UNITED STATES PATENT AND TRADEMARK OFFICE
CERTIFICATE OF CORRECTION

| | | |
|---|---|---|
| PATENT NO. | : 8,756,637 B1 | Page 1 of 1 |
| APPLICATION NO. | : 13/685783 | |
| DATED | : June 17, 2014 | |
| INVENTOR(S) | : Newton Guillen | |

It is certified that error appears in the above-identified patent and that said Letters Patent is hereby corrected as shown below:

Claims
Column 7, Line 4, Delete "actuator" and insert --actuator,--, therefor.

Signed and Sealed this
Fifteenth Day of September, 2015

Michelle K. Lee
*Director of the United States Patent and Trademark Office*